(12) United States Patent
Matsunaga

(10) Patent No.: US 6,742,055 B2
(45) Date of Patent: May 25, 2004

(54) DATA TRANSMISSION SYSTEM, DATA TRANSMISSION TERMINAL, CONTROLLER AND INTERFACE METHOD

(75) Inventor: Haruko Matsunaga, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 09/802,143

(22) Filed: Mar. 8, 2001

(65) Prior Publication Data

US 2001/0027500 A1 Oct. 4, 2001

(30) Foreign Application Priority Data

Mar. 9, 2000 (JP) ........................................ 2000-064719

(51) Int. Cl.$^7$ ................................................ G06F 3/00
(52) U.S. Cl. ........................ 710/10; 710/104; 710/302; 713/1
(58) Field of Search ............................ 710/1, 8, 10, 18, 710/19, 300, 313, 314, 244, 104, 301, 302; 713/1, 100

(56) References Cited

U.S. PATENT DOCUMENTS

| | | | | |
|---|---|---|---|---|
| 5,619,722 A | * | 4/1997 | Lovrenich | 710/2 |
| 6,122,676 A | * | 9/2000 | Brief et al. | 710/9 |
| 6,134,616 A | * | 10/2000 | Beatty | 710/104 |
| 6,263,392 B1 | * | 7/2001 | McCauley | 710/305 |
| 6,366,964 B1 | * | 4/2002 | Shima et al. | 710/8 |
| 6,415,342 B1 | * | 7/2002 | Wahl et al. | 710/100 |
| 6,496,893 B1 | * | 12/2002 | Arai | 710/302 |
| 6,505,265 B1 | * | 1/2003 | Ishikawa et al. | 710/113 |
| 6,516,367 B1 | * | 2/2003 | Barenys et al. | 710/109 |
| 6,600,739 B1 | * | 7/2003 | Evans et al. | 370/362 |

OTHER PUBLICATIONS

"USB" in: Microsoft Press Computer Dictionary, (3rd Edition), p. 487. Ref. QA 76.15.M54 1997 c.289.*
Universal Serial Bus Specification. Revision 1.0. Chapter 4, Architectural Overview. [Jan. 15, 1996].*

* cited by examiner

Primary Examiner—Mark H. Rinehart
Assistant Examiner—Thomas J. Cleary
(74) Attorney, Agent, or Firm—Floyd A. Gonzalez

(57) ABSTRACT

A data transmission system dynamically re-enumerating end points that are not used at the same time when the number of end points supported by a USB controller chip is insufficient, so that hardware costs can be considerably reduced. The data transmission system comprises a USB device controller which can be connected, via a USB interface, to a PC, which is a host and which enumerates, as USB functions, a plurality of functions selected from a function group; and a RAM, which is used to store order information in accordance with which functions should be enumerated as USB functions. Based on the order information stored in the RAM, the USB device controller can select a predetermined number of functions, can enumerate, as the number of USB end points, the functions that can be supported by the USB device controller, and can transmit the configuration of the USB functions to the PC.

17 Claims, 6 Drawing Sheets

DATA TRANSMISSION SYSTEM, DATA TRANSMISSION TERMINAL, CONTROLLER AND INTERFACE METHOD

FIELD OF THE INVENTION

The present invention relates to a peripheral interface for a personal computer (PC), and more specifically, pertains to a method whereby a plug-and-play function, a feature of the USB (the Universal Serial Bus), is effected without requiring the intervention of an operator.

BACKGROUND OF THE INVENTION

For an extended period of time, serial ports, represented by the standard interface RS-232C, and parallel ports, represented by the Centronics interface, have been the primary peripheral interfaces employed for personal computers (PCs). However, the maximum transmission speeds available with these ports are limited and are lower than those provided by other interfaces. In addition, each of these ports can accommodate only one device, so that if an additional peripheral device is to be connected to a PC, the number of available ports must be increased by one. Furthermore, individual ports are required for display devices, keyboards and mice, so that at present the rear faces of PCs are remarkably busy, and a variety of different ports are displayed for which the required connectors differ in accordance with the apparatuses for which they are to be used. Appropriate cables must therefore be procured and correctly matched when port connections are made, thereby increasing and complicating the labor imposed on operators (users).

To resolve these problems, the USB (Universal Serial Bus) has drawn special attention. The USB standardizes the interfaces and permits the connection to one port of a plurality of peripheral devices. The conventional serial and parallel interfaces basically provide one-to-one connections, and when a plurality of devices, such as a modem and a terminal adaptor (TA), are to be connected, a cable must be re-connected thereto each time, or a switching device is required. However, with USB, a maximum 16 independent functions can be defined for one peripheral device, and using hubs, a maximum 127 peripheral devices can be connected, as a tree. Further, the USB transmission speed is 12 Mbps at the maximum, which is about 100 times that of the RS-232C, the current main serial interface. In addition, USB includes a hot plug function that permits the removal and insertion of cables while the power to peripheral devices is on, and a plug-and-play (Plug & Play) function whereby a PC can automatically identify a peripheral device when it is connected to the PC. In addition to these advantageous features, USB is functionally superior, and as a result, has rapidly drawn attention as the standard peripheral interface that will most probably be used for the next-generation machines.

USB can provide an effective base for a system in which multiple peripheral terminal devices are connected together, and is especially suitable, for example, for a POS (Point Of Sales) system (point of sales information management system) in which multiple peripheral devices, such as a scanners for reading bar codes of product labels, handy terminals, electronic cash registers and touch panels, are connected to a computer called a store controller to which all information is transmitted. While the operation of a conventional POS system entails the use of a dedicated POS interface and software, there is a growing demand for a process by which conventional software, such as Windows, can be utilized to operate a POS system. Further, since in a store wherein mainly a POS system is employed, the connection and disconnection of peripheral devices is probably a frequent occurrence, and the plug-and-play and the hot plug functions of USB will effectively permit anyone to easily extend the system.

As is described above, a USB interface is so designed that it has a maximum of 16 functions (end points) for in and out transactions. However, conventionally, the majority of the USB controller chips sold by individual companies support only three to five end points, and are more distributed than are those that support more end points. A USB controller chip supports a USB interface that is combined with a controller LSI on a USB incompatible peripheral device; however, in order to include multiple functions, as does a POS terminal, the number of end points provided for one USB controller chip is insufficient. Therefore, a plurality of controllers are required, and accordingly, additional peripheral circuits, such as hubs, must be provided, a process that greatly increases manufacturing costs.

Furthermore, the individual functions that are available are normally optional, and since not all functions are employed at the same time, the increase in manufacturing costs involved in supporting optional, additional functions frequently presents an especially large problem for those stores wherein POS terminals are employed. On the other hand, there is a strong demand that the plug-and-play function, a major USB feature, be supported as a connection function, even though it is optional.

SUMMARY OF THE INVENTION

To resolve the above technical shortcomings, it is one object of the present invention to considerably reduce the hardware costs for a system in which the use of USB is supported by the employment of a USB controller chip.

It is another object of the present invention to dynamically reconstruct (re-enumerate) end points that are not used at the same time when the number of end points supported by a USB controller chip is insufficient, and to effectively employ multiple functions.

To achieve the above objects, according to one aspect of the invention, a data transmission system comprises: a controller connected to a bus; and a plurality of functions connected to the controller, wherein the controller selects a predetermined number of functions from among the plurality of functions, and assigns the predetermined number of functions to a plurality of corresponding end points, and wherein, thereafter, the controller selects, from among the plurality of functions connected to the controller, a plurality of different functions, whose constitution is different from the functions that are assigned as the end points to reconstruct end points to provide a configuration that is compatible with the bus.

The bus is compatible with a plug-and-play function, and multiple functions can be connected as end points that are compatible with the bus. This configuration is preferable because the plug-and-play function, which is the feature of the bus, can be provided by software, without the intervention of an operator being required. Further, the bus will match or conform to the USB (Universal Serial Bus) standard.

In addition, when functions that differ from those that are assigned as the end points are requested, those end points that are compatible with the bus can be reconstructed. Such a configuration is superior because necessary functions can be assigned as end points compatible with the subject bus, without having to increase the number of controllers.

The term "end points" is used to indicate functions that are identified, for example, as USB interface terminal functions by a host. The term "thereafter" corresponds to a case wherein, after a system is powered on, a request for the connection of another function is transmitted to a host, or when an operator is manipulating another function.

According to another aspect of the invention, a data transmission system comprises: a host; a controller connected to the host via a plug-and-play compatible bus; and a plurality of functions, provided by the connected controller, that exceed in number the maximum end points that the controller can support, wherein the controller selects a predetermined number of functions from among the plurality of functions and enumerates, as end points, the functions that match in number the maximum end points, and wherein, thereafter, the controller replaces with a different function one of the functions that constitute the end points, and re-enumerates the end points.

When the controller is activated, the controller selects from among the plurality of functions a predetermined number, and assigns the selected functions to end points. Also, the controller selects a function requested by the host or one that is employed by the operator, and then reconstructs the end points. In addition, the controller selects functions, in priority order, up to and equal to the maximum number of end points that can be supported. This configuration is preferable, because even when a controller has an insufficient number of end points, another controller or a peripheral circuit, such as a hub, need not be additionally provided, and a considerable reduction in manufacturing costs can be realized.

According to an additional aspect of the invention, a data transmission terminal, which can be connected to a host via a USB interface and to which a plurality of functions are connected, comprises: a controller for constituting the plurality of functions as USB compatible functions; and a memory used to store information relative to the order in which a plurality of functions should be enumerated as being USB compatible functions, wherein, based on the order of the information stored in the memory, the controller selects a predetermined number of functions from among the plurality of functions, enumerates the number of functions that is available, within the limits imposed on the functions that can be supported as USB functions, and notifies the host of the a configuration of the USB compatible functions. The data transmission terminal corresponds, for example, to a POS terminal.

As needed, the controller reconstructs, as USB compatible functions, functions that differ from the functions that are already serving as the USB compatible functions. Therefore, a function having a low priority, which is reported to the host as though it is not connected, can be added as necessary to the end points upon receipt of a request or an operation instruction, and the end points can then be reconstructed (enumeration). Therefore, even when for the controller there is and insufficient number of end points, a function having a low priority can be supported.

According to a further aspect of the invention, a controller, which can be connected to a host via a plug-and-play compatible bus and that provides access to a plurality of functions, comprises: assignment means for selecting predetermined functions from among a plurality of functions and for assigning the predetermined functions to end points compatible with the bus; request acceptance means for accepting requests for functions other than the predetermined functions that are selected as the end points; and re-assignment means for reassigning the requested functions as end points compatible with the bus.

From among a number of functions that is greater than the number of end points that the controller can support, the assignment means selects a number of functions that matches the number of end points, and assigns them as end points. The request acceptance means accepts a request by identifying a request command received from the host or an operation performed by an operator for a function other than the predetermined functions. For example, when a key pad is not selected by a POS system, a request can be accepted when an operator manipulates the key pad.

According to one more aspect of the invention, an interface method, for enabling a host to determine whether a plurality of functions connected to a controller are bus end points, comprises the steps of: connecting, to the controller, a number of functions that exceeds the number of end points that the controller can support; selecting, from among the plurality of connected functions, functions equivalent in number to the count of the end points that the controller can support; notifying the host of the existence of functions other than the selected functions as though the functions were not connected; and removing a specific function from the selected functions when a request for a different function is issued by the host or when an operator manipulates a switch to activate a different function, and allocating, as end points, functions including the different function that is requested or is activated.

A number of functions equivalent to the number of end points that are supported by the controller are selected in a descending priority order that is defined in advance, and based on the priority order, the specific function is removed from the end points. Further, the employment states of the plurality of functions are obtained, and the removal of the specific function is based on the employment states. These configurations are preferable because a reduction in the number of controllers and in the manufacturing costs can be realized while an operating level can be maintained that is, to a degree, superior.

According to yet another aspect of the invention, an interface method for defining USB compatible functions for a plurality of functions that are provided by a USB controller, comprises the steps of: selecting, at the time of activation, from among the plurality of functions a number of functions that the USB controller can support as USB compatible functions, and enumerating the USB compatible functions; receiving a request for functions other than the selected functions; and re-enumerating the requested functions as USB compatible functions.

Further, at the time of activation, a function that is required for the activation and one that is frequently used are selected and enumerated as USB compatible functions. Then, even when it is determined that the number of end points that the controller can support is insufficient, required functions can be dynamically reconstructed, and can be used as USB functions.

According to yet an additional aspect of the invention, an interface method whereby a system can be connected to a host via a USB interface and a plurality of functions can subsequently be connected to the system, comprises the steps of: activating the system as a USB compatible terminal that includes a predetermined number of frequently employed functions selected from among the plurality of functions; changing the configuration of the functions, as needed, after power has been rendered on; reconstructing the functions as the USB compatible terminal based on the alteration of the configuration, so that the plug-and-play function can be provided by software. This configuration is preferable because even when, as the USB terminal, the support capability is low, reconstruction enables the support of a USB compatible terminal, and ensures that a high performance will be obtained and that manufacturing costs will be reduced.

BRIEF DESCRIPTION OF THE DRAWINGS

These and other objects will be apparent to one skilled in the art from the following detailed description of the invention taken in conjunction with the accompanying drawings in which.

DETAILED DESCRIPTION OF THE INVENTION

Figure 1:
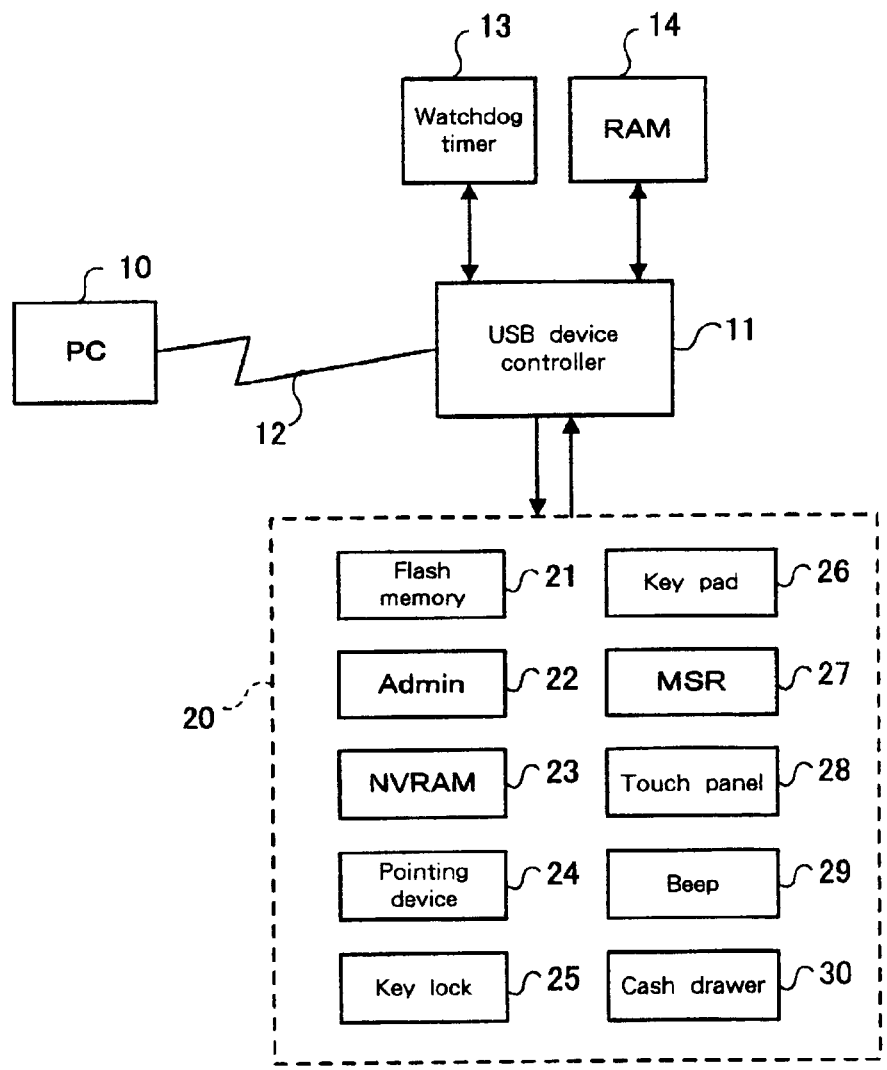
FIG. 1 is a block diagram for explaining the POS system to which the present invention is applied.

FIG. 1 is a block diagram for explaining a POS system to which the embodiment of the invention is applied. A USB device controller 11, which serves as a USB controller chip, is connected via a USB interface 12 to a personal computer (PC) 10, the host, and supports a group 20, consisting of a plurality of functions, as a USB terminal. The USB device controller 11 is also connected to a watchdog timer 13 and a RAM 14 for the storage of configuration information pertaining to the function group 20.

As the functions of the POS terminal that serves as a data transmission terminal, the function group 20 includes: a flash memory 21, in which is stored the microcode (firmware) that is used for updating a program and that is employed when the system is activated; an administrator (Admin) 22, which is an interface that is used to manage a device, such as when to accept a command to change the setup; an NVRAM 23, which is used to write a setup values that provide inherent adjustment values for individual devices; a pointing device 24, which designates a position on a display screen; a key lock 25, which is used when data is exchanged by operators; a key pad 26, which is used to accept a key entry; a mag stripe reader (MSR) 27, which is used to read a credit card or to read the ID of an operator; a touch panel 28 attached to top of the display, which an operator uses to enter data by depressing keys with his or her fingers; a beep 29, which is generated as an alarm or when a key on the key pad 26 is clicked; and a cash drawer 30, in which money is retained.

The watchdog timer 13 is used to automatically reset the USB device controller 11 when a firmware operation is not completed. That is, when a program is running and no runtime error is encountered, the watchdog timer 13 periodically permits the writing of data to the USB device controller, and when a control signal is not received from microcode stored in the flash memory 21, the watchdog timer 13 ascertains that a microcode runtime error has occurred and inhibits writing. In this embodiment, the function of the watchdog timer 13 is utilized, specifically, to change the functions in the group 20. The watchdog monitor 13 is so designed that it can intentionally inhibit writing and can reset the USB device controller 11 so that the functions in the group 20 can be reconstructed.

Figure 2:
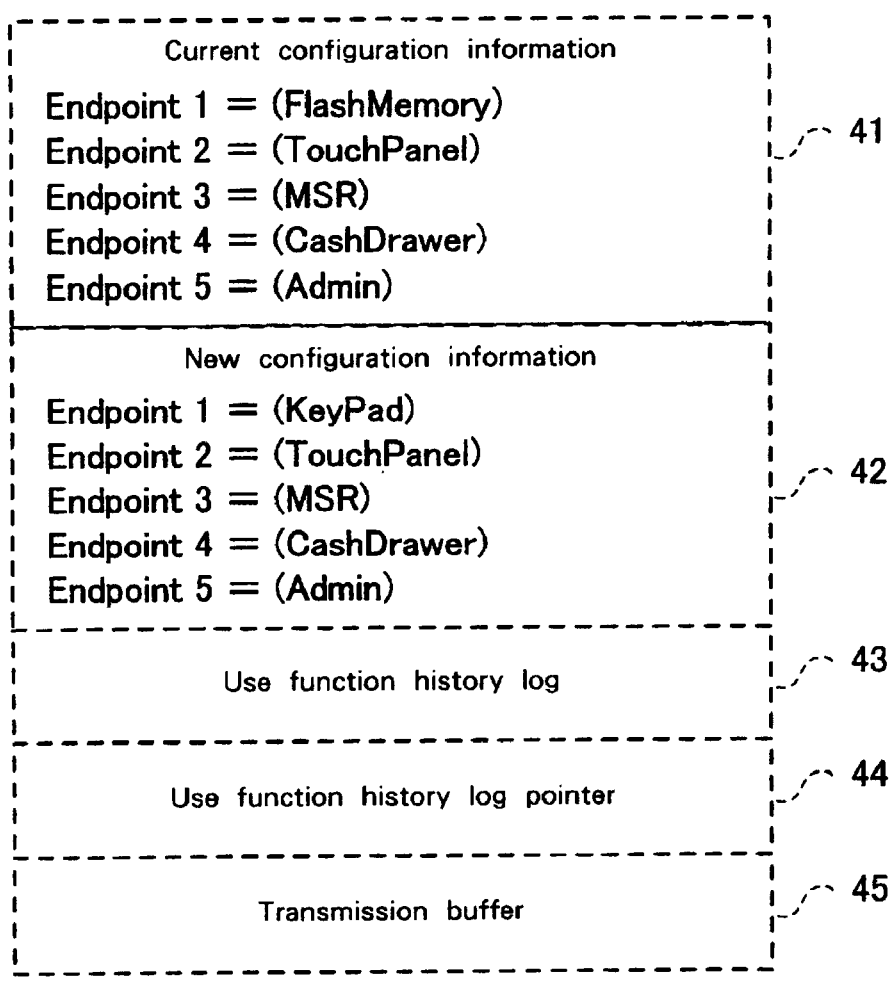
FIG. 2 is a diagram for explaining the logical components of a RAM 14.

FIG. 2 is a diagram for explaining the logical components in the RAM 14. The logical components in the RAM 14 of this embodiment are: current configuration information 41, which is configuration information for the end points of a current USB that are stored in a predetermined priority order that will be described later; new configuration information 42, which is to be reconstructed either by an operator manipulating a predetermined function or by the PC 10; a use function history log 43, in which past use frequency information is stored; a use function history log pointer 44, which points to the latest history log; and a transmission buffer 45, for the storage of data concerning the new configuration information 42 that are to be transmitted to the PC 10.

Figure 3:
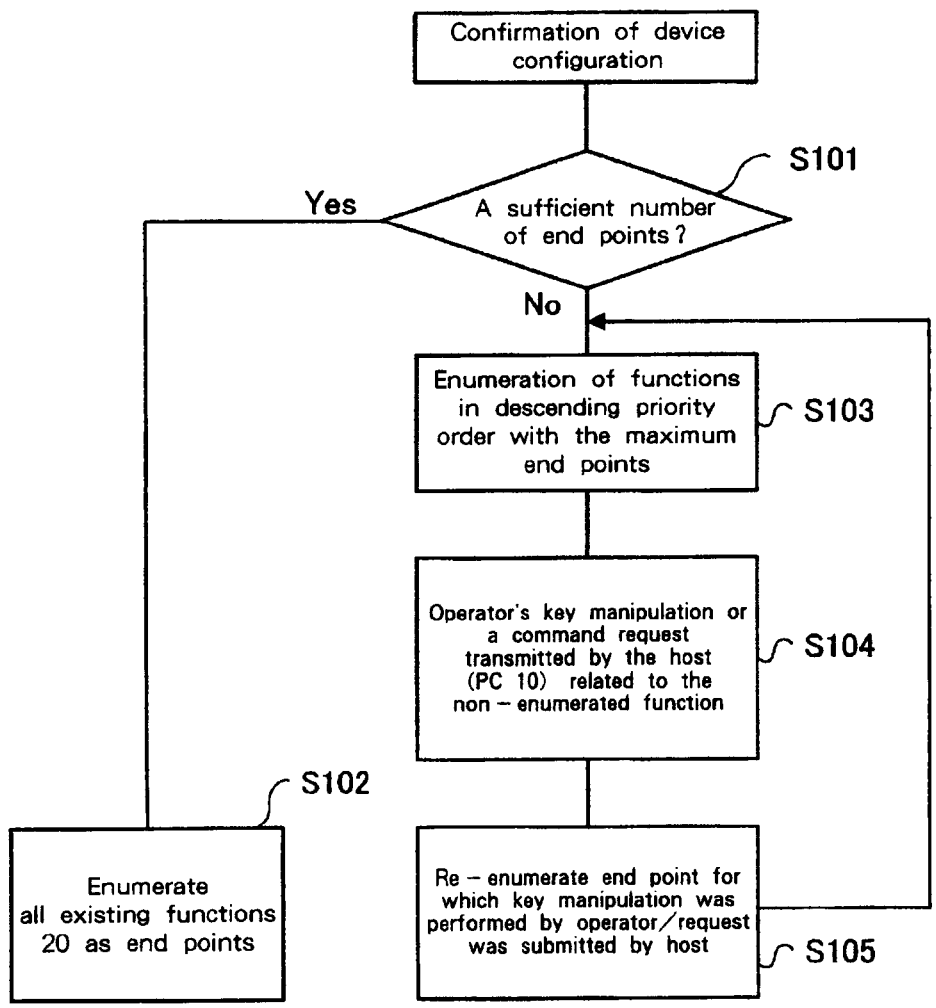
FIG. 3 is a flowchart showing the device configuration performed by a USB device controller 11 in this embodiment.

FIG. 3 is a flowchart for the device configuration at the time of activation, which is performed by the USB controller 11 of this embodiment. As confirmation of the device configuration at the time of activation, first, the number of the connected functions 20 is compared with the number of end points that are supported by the USB device controller 11, and a determination is made as whether the number of end points is sufficient (step 101). When the number of end points is sufficient, all the existing functions 20 are regarded as end points for the USB, and the USB interface with the PC 10 is constructed (step 102). When the number of end points is insufficient, the functions are enumerated in the descending priority order in order to use the PC 10 to construct a USB interface by employing the maximum number of end points (step 103). Then, an operation by an operator or a request command received from the host (PC 10) is confirmed for functions that are not enumerated (step 104). Upon the receipt of an operation from an operator or of a request from the PC 10, a function corresponding to the operation or the request is selected and is assigned as an end point in order to reconstruct (re-enumerate) the USB interface with the PC 10 (step 105). Thus, although all the functions included in a product are not readied for use at the same time, at the same time a product can be activated as a terminal having only functions that are frequently used, and the configuration can be changed as needed.

Figure 4:
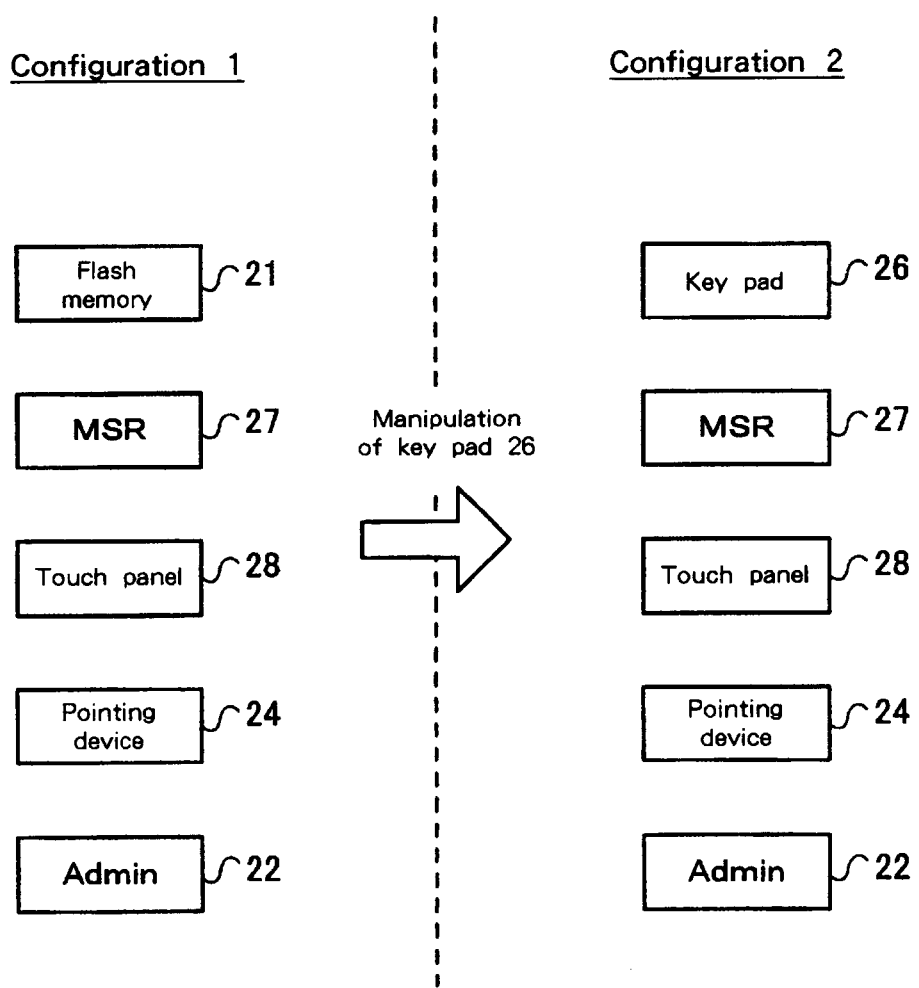
FIG. 4 is a diagram showing an example USB re-configuration for this embodiment.

FIG. 4 is a diagram showing an example re-construction of the USB configuration for this embodiment. Assume that the USB device controller 11 supports a maximum five end points, and that, in accordance with a priority determination method that will be described later, in configuration 1 the flash memory 21, the MSR 27, the touch panel 28, the pointer device 24 and the Admin 22 are enumerated as USB functions. When the key pad 26 is manipulated by an operator, it can be ascertained that a request for use has been issued by the operator. However, since the key pad 26 is not enumerated as a USB function in configuration 1, a re-enumeration of the functions is required. In this embodiment, based on a priority determination that will be described later, the functions are replaced with others in accordance with the ascending priority order. For example, since the flash memory 21 is a function employed for activation, in the example in FIG. 4, the flash memory 21 is replaced by the key pad 26 to form configuration 2. This alteration is stored as the new configuration information 42 in the RAM 14 in FIG. 2, and transmission data are transmitted to the PC 10.

The method used for determining the priority for each function will now be described. The determination of the priority is performed mainly for the following three functions, a to c:

a. a function that is always required (e.g., the Admin 22)
b. a function (e.g., the flash memory 21 or the NVRAM 23) used only in a specific case, such as the initialization of the PC 10 and a maintenance mode
c. a function used for normal operations For function c, the priority is defined in advance in the microcode (firmware) stored in the flash memory 21. For example, the touch panel 28, the pointing device 24, the cash drawer 30, the key lock 25, the MSR 27 and the key pad 26 are arranged therein the descending priority order.

When the power is switched on (when the current configuration information 41 and the new configuration information 42 in FIG. 2 are not effective), the functions a, b and c that are actually connected are enumerated in the descending priority order, and are written in the current configuration information 41 in the RAM 14.

When once the USB configuration (enumeration) with the host PC 10 has been completed (when the current configuration information 41 in FIG. 2 is effective and the new configuration information 42 is not effective), and when a key manipulation is performed for a function that has not been selected as c, the function b is removed from the new configuration, the function for which the manipulation was performed is added into the configuration, and the new configuration is written in the new configuration information 42.

Thereafter (when the current configuration information 41 and the new configuration information 42 have become effective), when a key manipulation is performed for another function that has not been enumerated, the function c that is included in the current configuration information 41 and that has not been recently employed, and therefore has a low employment frequency, is removed from the new configuration information 42 by performing a process that will be described later, and the function for which the key manipulation was performed is added to the new configuration information 42 to update it.

Figure 5:
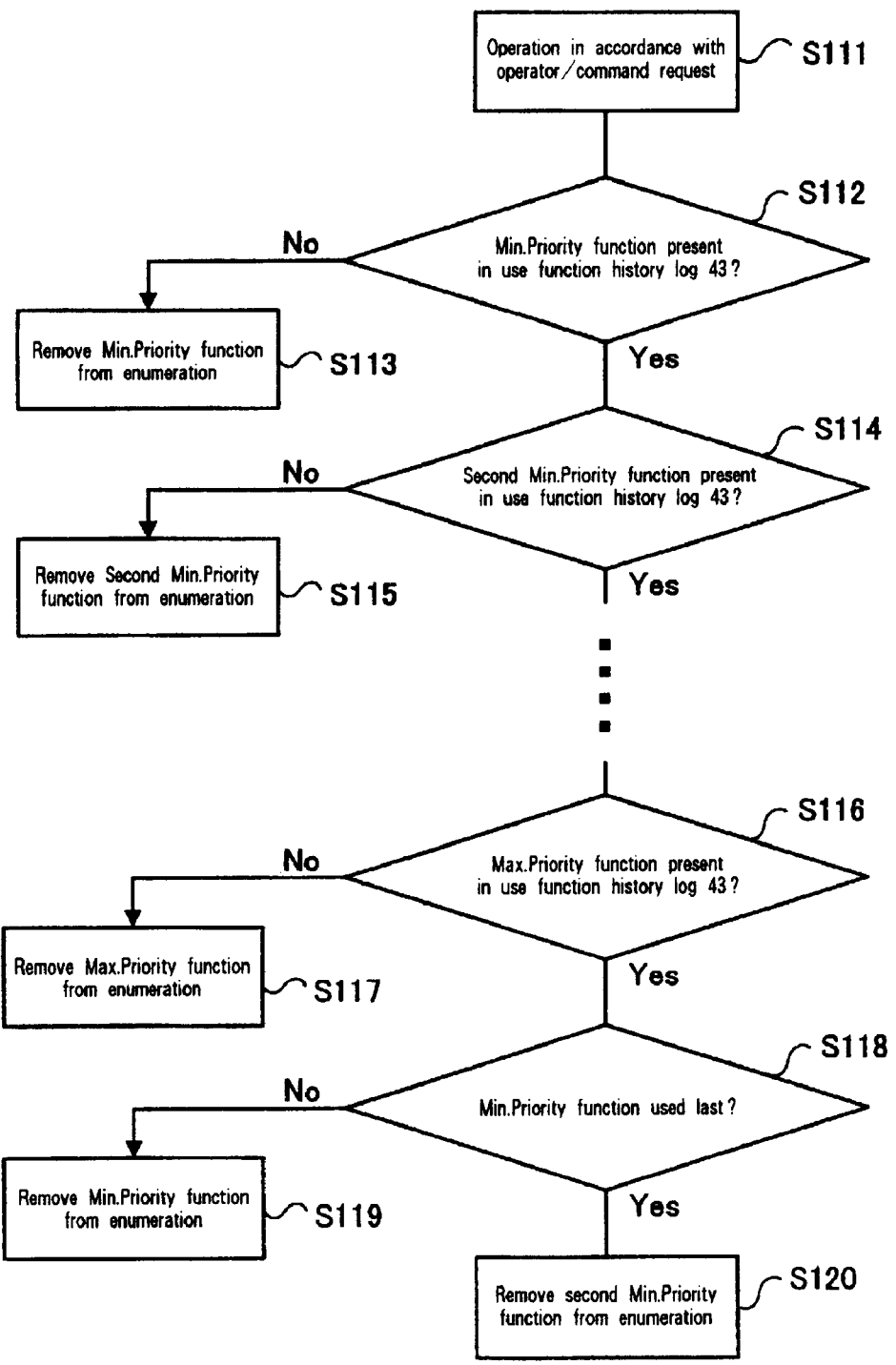
FIG. 5 is a flowchart for explaining the processing for removing a specific function from the configuration in order to change the enumeration of end points.

FIG. 5 is a flowchart for explaining the processing for removing a specific function from the configuration so as to change the enumeration of end points. When an operation by an operator is entered or a command request is issued by the host (PC 10) (step 111), first, a check is performed to determine whether a the function having the lowest priority is present in the use function history log 43 of the RAM 14 (step 112). When the function having the lowest priority is not present therein, this function is removed from the enumeration (step 113), and the processing for the removal of a specific function is thereafter terminated. When the function having the lowest priority is present in the use function history log 43, a check is performed to determine whether a function having the second lowest priority is present in the use function history log 43 (step 114). If a function having the second lowest priority is not present, this function is removed from the enumeration (step 115). In this manner, the states of the histories of the functions are examined in the ascending priority order, and a check is finally performed to determine whether a function having the highest priority is present in the use function history log 43 (step 116). If a function having the highest priority is not present, this function is removed from the enumeration (step 117). Whereas if a function having the highest priority is present in the use function history log 43, a check is performed to determine whether another condition is present, i.e., whether the function having the lowest priority was employed last (step 118). When the function having the lowest priority was employed last, it is ascertained that the removal of this function is not appropriate, and the function having the second lowest priority is removed from the enumeration (step 120). In this manner, based on the priority order, a specific function can be removed.

Figure 6:
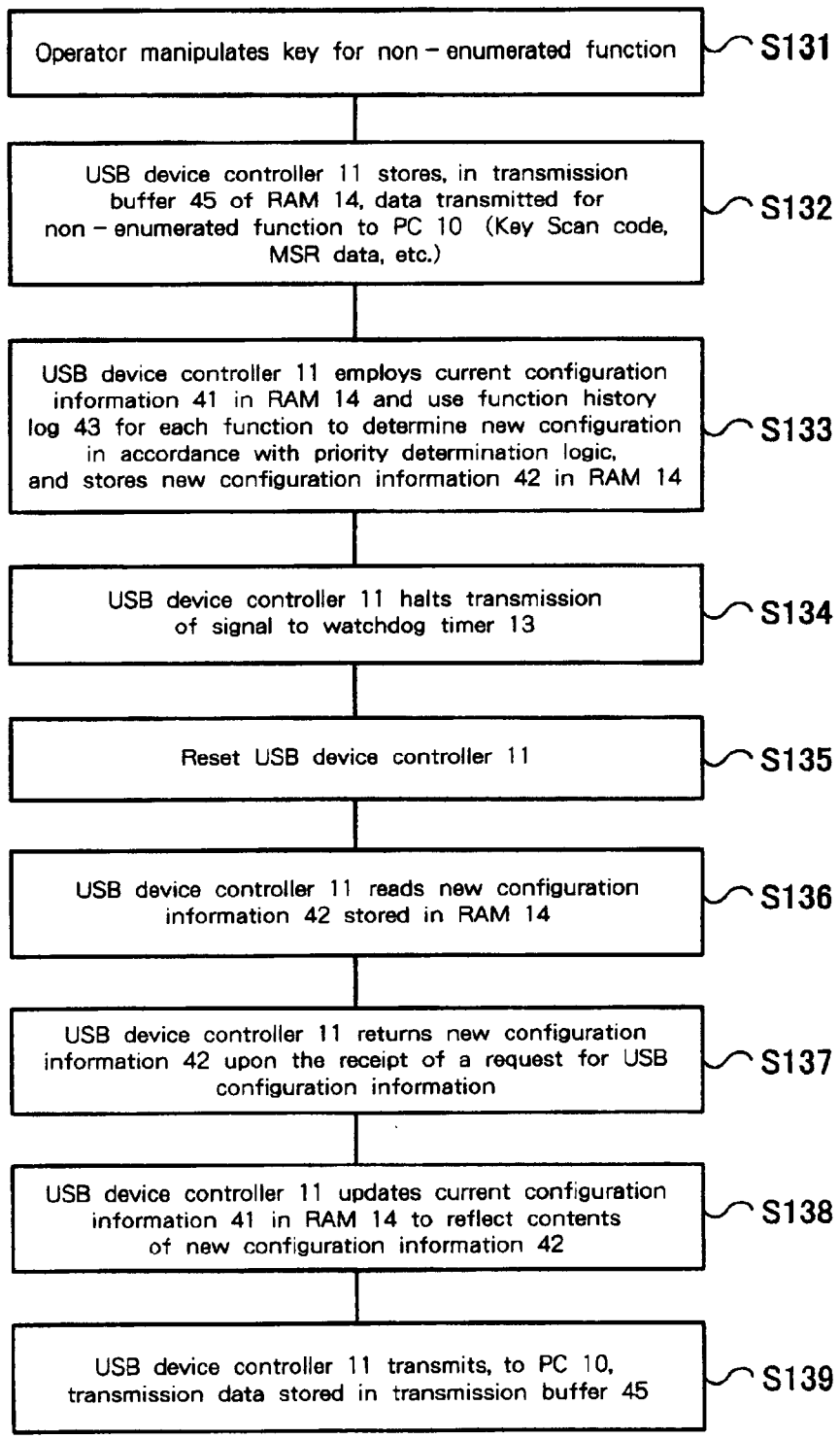
FIG. 6 is a flowchart showing the processing performed for the re-enumeration of functions.

FIG. 6 is a flowchart showing the processing for re-enumerating functions. First, when key manipulation by an operator is performed for a function that is not enumerated (step 131), the USB device controller 11 stores, in the transmission buffer 45 in the RAM 14, the data that are transmitted for the non-enumerated function to the PC 10 (step 132). The data, for example, are key scan code or MSR data. Then, the USB device controller 11 employs the current configuration information 41 stored in the RAM 14 and the use function history log 43 for each function to determine a new configuration in accordance with the above described priority determination logic, and thereafter stores the new configuration information 42 in the RAM 14 (step 133). Then, the USB device controller 11 halts the transmission of a signal to the watchdog timer 13 (step 134), and is reset (step 135). That is, as was previously described, the original function of the watchdog timer 13 is utilized; the writing is intentionally inhibited; the USB device controller 11 is reset by the watchdog timer 13; and the plug-and-play function in the group 20 is available.

Then, the USB device controller 11 reads the new configuration information 42 from the RAM 14 (step 136), and transmits the new configuration information 42 as a reply in response to the receipt of a USB configuration information request from the PC 10 (step 137). Further, the USB device controller 11 updates the current configuration information 41 in the RAM 14 to correspond with the contents of the new configuration information 42 (step 138). Following this, the USB device controller 11 transmits, to the PC 10, the transmission data stored in the transmission buffer 45 (step 139). Through the above processing, the re-enumeration of the functions is completed.

As is described above, since normally the individual functions are optional, and not all of the functions are employed at the same time, in this embodiment, when the power is switched on, the presence/absence of each function is examined, and only a connected function is reported to the host (PC 10). If the number of connected functions is equal to or smaller than the number of end points that are supported by the USB device controller 11, no problem occurs. However, if the number of functions exceed the count of the end points that are connected, functions, equivalent in number to the end points that are supported by the USB device controller, are selected in accordance with the descending priority order, which is defined in advance, and are allocated as end points, and those functions that have low priorities are reported to the host as though they were not connected. Thereafter, when a function having a low priority is requested by the host or key manipulation for it is performed by the operator, the priority is changed, and the listing of USB functions is re-enumerated in order to include the requested function.

As is described above, according to the embodiment, not all the functions of a product are set so they are available at the same time, but instead a product is activated as a terminal that has only the functions that are frequently used at the same time, and thereafter the configuration is changed as needed. Therefore, even when a USB controller chip that supports only three to five end points is employed, the plug-and-play function is effectively applied using software, without the intervention of an operator being required, so that all the functions available with the USB controller chip can be supported as a USB terminal.

Further, when the number of end points that are used at the same time is apparently insufficient, it is preferable that the relationship between the processing time required for re-enumeration and operability be examined to determine whether the above method should be employed. However, when the number of end points is insufficient for a function, such as the maintenance function, that is not used during normal operations, the method of the embodiment for effecting the plug-and-play function is especially effective, because costs can be considerably reduced.

In this embodiment, the USB interface has been employed for the explanation, but the present invention is not limited to the USB interface. For example, the present invention can be applied for any interface that can apply the plug-and-play function and that can connect a plurality of other functions.

Further, in this embodiment, the POS terminal has been employed. The present invention, however, can be applied for another terminal, such as an audio system.

As is described above, according to the present invention, even when the number of end points (functions) that are supported by the USB controller chip is insufficient, end points that are not used at the same time can be dynamically changed, so that hardware costs can be considerably reduced.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A data transmission system comprising:
    a bus;
    a controller connected to said bus; and
    a plurality of functions connected to the controller,
    wherein the controller selects a predetermined number of functions from among the plurality of functions, and assigns the predetermined number of functions to a plurality of corresponding end points, and
    wherein, thereafter, the controller selects, from among the plurality of functions connected to the controller, a plurality of different functions, whose constitution is different from the functions that are assigned as the end points to reconstruct end points to provide a configuration that is compatible with the bus.

2. The data transmission system according to claim 1, wherein the bus copes with a plug-and-play function, and multiple functions are connected as end points that are compatible with the bus.

3. The data transmission system according to claim 1, wherein the bus matches or conforms to the USB standard.

4. The data transmission system according to claim 1, wherein, when functions that differ from those that are assigned as the end points are requested, the end points that are compatible with the bus are reconstructed.

5. A data transmission system comprising:
    a host;
    a plug-and-play compatible bus;
    a controller connected to the host via said plug-and-play compatible bus; and
    a plurality of functions, provided by the connected controller, that exceed in number the maximum end points that the controller can support,
    wherein the controller selects a predetermined number of functions from among the plurality of functions and enumerates, as end points, the functions that match in number the maximum end points, and
    wherein, thereafter, the controller replaces with a different function one of the functions that constitute the end points, and reconstructs the end points.

6. The data transmission system according to claim 5, wherein, when the controller is activated, the controller selects from among the plurality of functions a predetermined number, and assigns the selected functions to end points; and wherein the controller selects a function requested by the host or one that is employed by the operator, and then reconstructs the end points.

7. The data transmission system according to claim 5, wherein the controller selects functions, in priority order, up to and equal to the maximum number of end points that can be supported.

8. A data transmission terminal, which can be connected to a host via a USB interface and to which a plurality of functions are connected, comprising:
    a controller for constituting the plurality of functions as USB compatible functions; and
    a memory used to store information relative to the order in which a plurality of functions should be enumerated as being USB compatible functions,
    wherein, based on the order of the information stored in the memory, the controller selects a predetermined number of functions from among the plurality of functions including a function that is required for activation and that is frequently used, enumerates the number of functions that is available, within the limits imposed on the functions that can be supported as USB functions, and notifies the host of the configuration of the USB compatible functions.

9. The data transmission terminal according to claim 8, wherein, as needed, the controller reconstructs, as USB compatible functions, functions that differ from the functions that are already serving as the USB compatible functions.

10. A controller, which can be connected to a host via a plug-and-play compatible bus and that provides access to a plurality of functions, comprising:
    assignment means for selecting predetermined functions from among a plurality of functions and for assigning the predetermined functions to end points compatible with the bus;
    request acceptance means for accepting requests for functions other than the predetermined functions that are selected as the end points; and
    re-assignment means for reassigning the requested functions as end points compatible with the bus.

11. The controller according to claim 10, wherein, from among a number of functions that is greater than the number of end points that the controller can support, the assignment means selects a number of functions that matches the number of end points, and assigns them as end points.

12. The controller according to claim 10, wherein the request acceptance means accepts a request by identifying a request command received from the host or an operation performed by an operator for a function other than the predetermined functions.

13. An interface method, for enabling a host to determine whether a plurality of functions connected to a controller are bus end points, comprising the steps of:
    connecting, to the controller, a number of functions that exceeds the number of end points that the controller can support;

selecting, from among the plurality of connected functions, functions equivalent in number to the count of the end points that the controller can support;

notifying the host of the existence of functions other than the selected functions as though the functions were not connected; and removing a specific function from the selected functions when a request for a different function is issued by the host or when an operator manipulates a switch to activate a different function, and allocating, as end points, functions including the different function that is requested or is activated.

14. The interface method according to claim 13, wherein a number of functions equivalent to the number of end points that are supported by the controller are selected in a descending priority order that is defined in advance, and based on the priority order, the specific function is removed from the end points.

15. The interface method according to claim 13, wherein the employment states of the plurality of functions are identified, and the removal of the specific function is based on the employment states.

16. An interface method for defining USB compatible functions for a plurality of functions that are provided by a USB controller, comprising the steps of:

selecting, at the time of activation, from among the plurality of functions a number of functions that the USB controller can support as USB compatible functions including a function that is required for the activation and that is frequently used, and enumerating the USB compatible functions;

receiving a request for functions other than the selected functions; and reconstructing the requested functions as USB compatible functions.

17. An interface method whereby a system can be connected to a host via a USB interface and a plurality of functions can subsequently be connected to the system, comprising the steps of:

activating the system as a USB compatible terminal that includes a predetermined number of frequently employed functions selected from among the plurality of functions including a function that is required for the activation;

changing the configuration of the functions, as needed, after power has been rendered on;

reconstructing the functions as the USB compatible terminal based on the alteration of the configuration, so that the plug-and-play function can be provided by software.

* * * * *